Jan. 23, 1968  A. R. McLERRAN  3,365,081
PIPE ELEVATOR AND POSITIONING APPARATUS THEREFOR
Filed Dec. 13, 1965  6 Sheets-Sheet 1

Archie R. McLerran
INVENTOR.

BY Browning, Simms, Hyer & Fishermast

ATTORNEYS

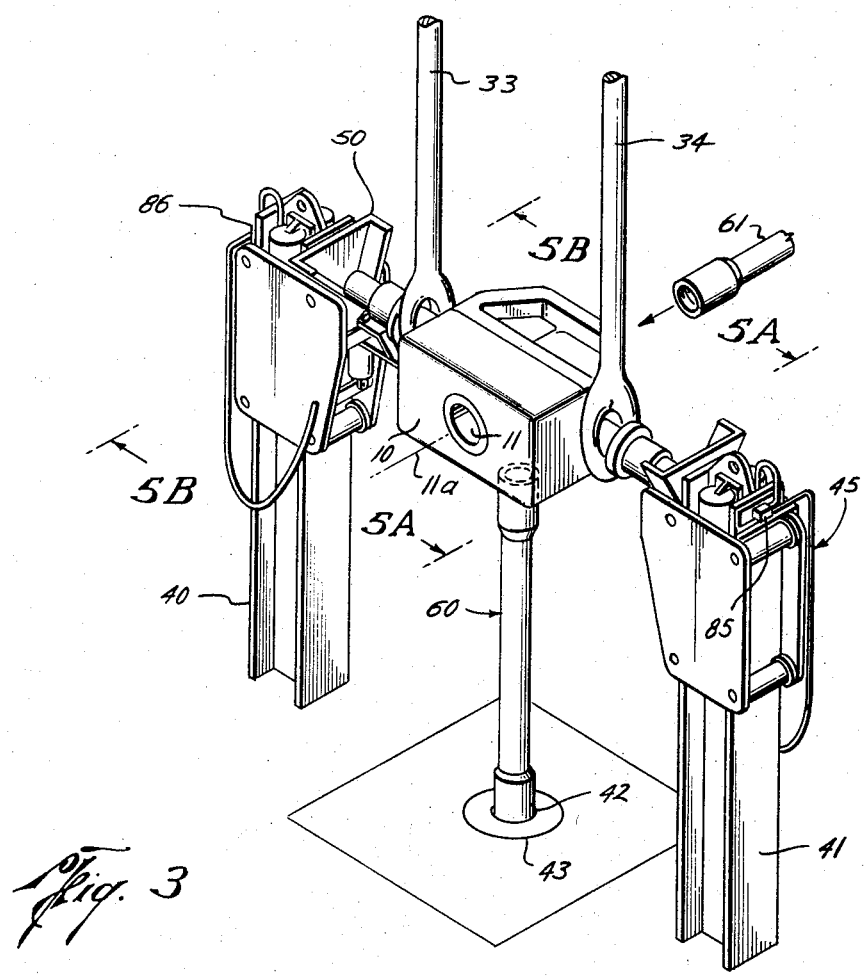

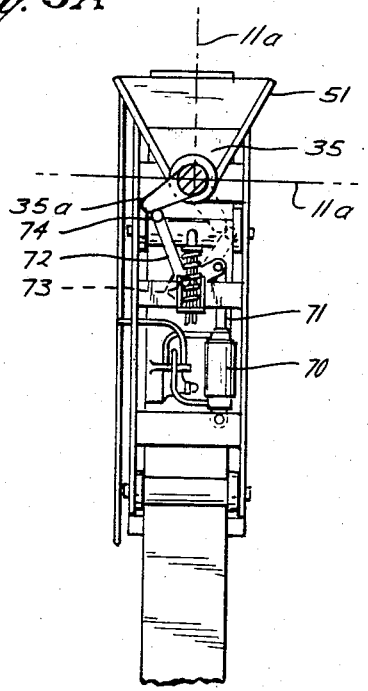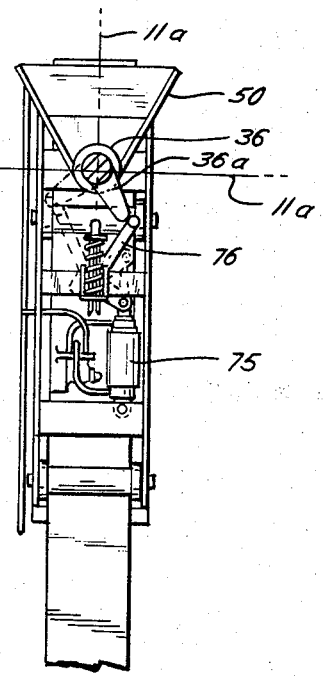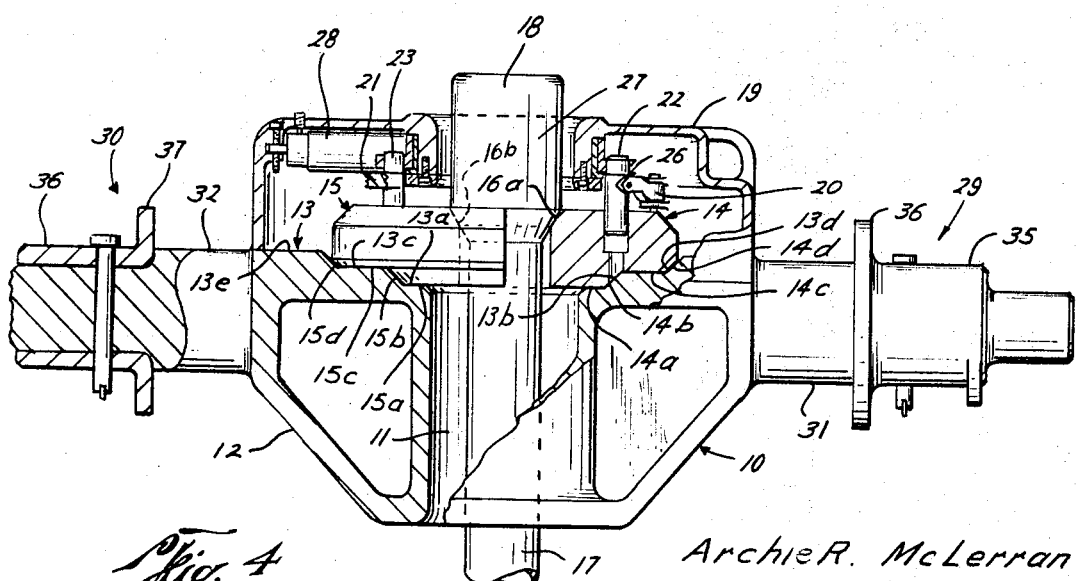

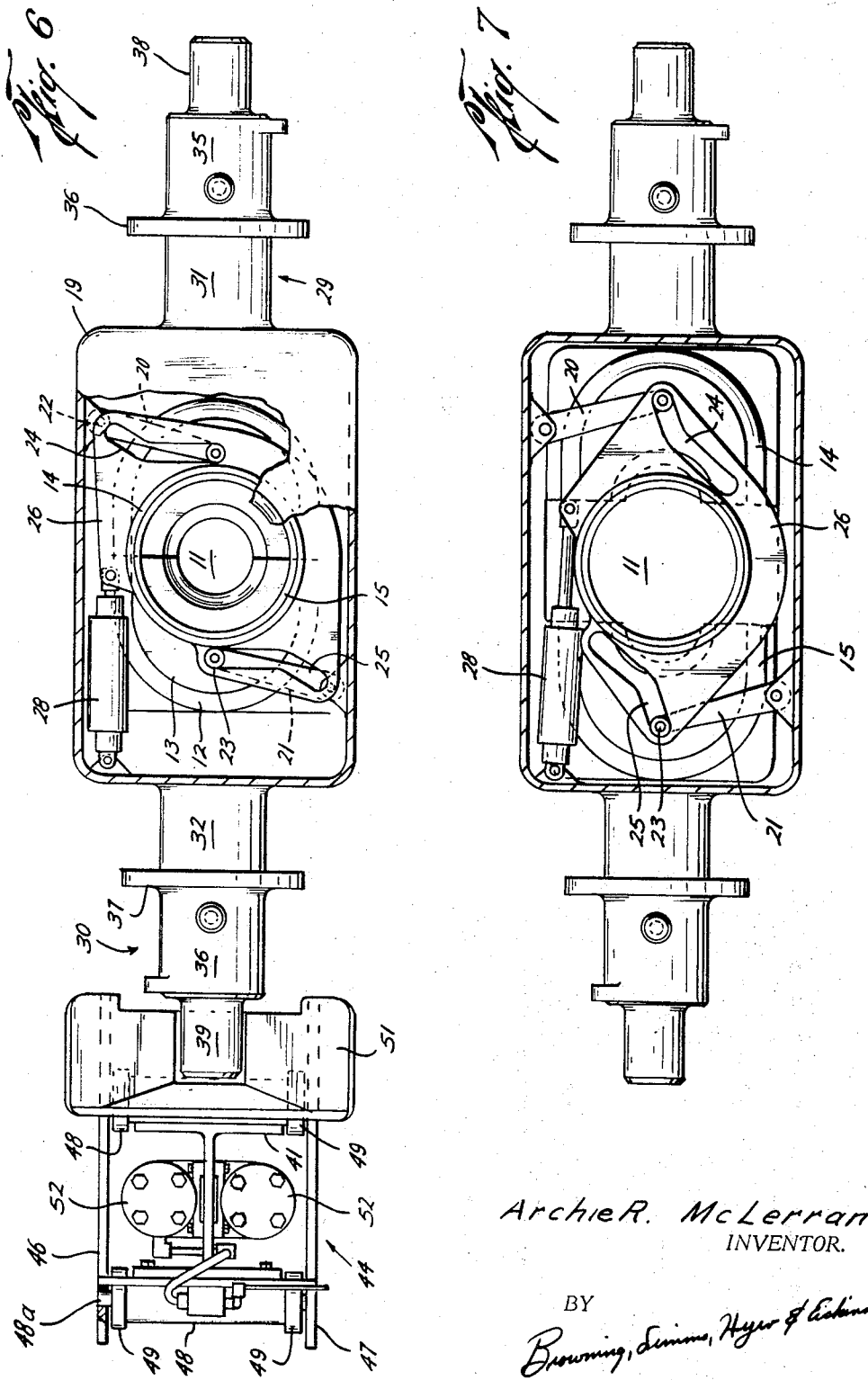

Jan. 23, 1968          A. R. McLERRAN          3,365,081
PIPE ELEVATOR AND POSITIONING APPARATUS THEREFOR
Filed Dec. 13, 1965          6 Sheets-Sheet 5
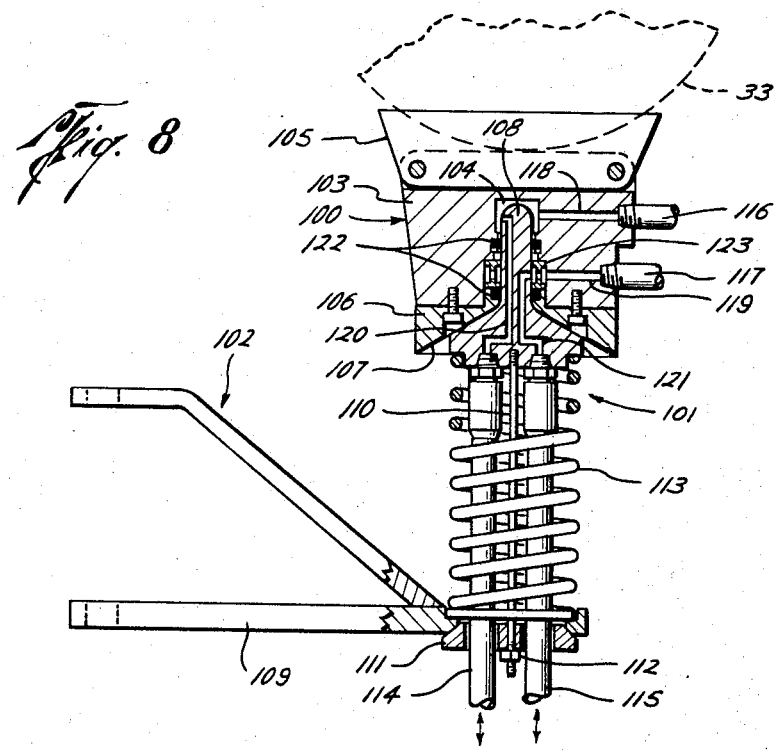
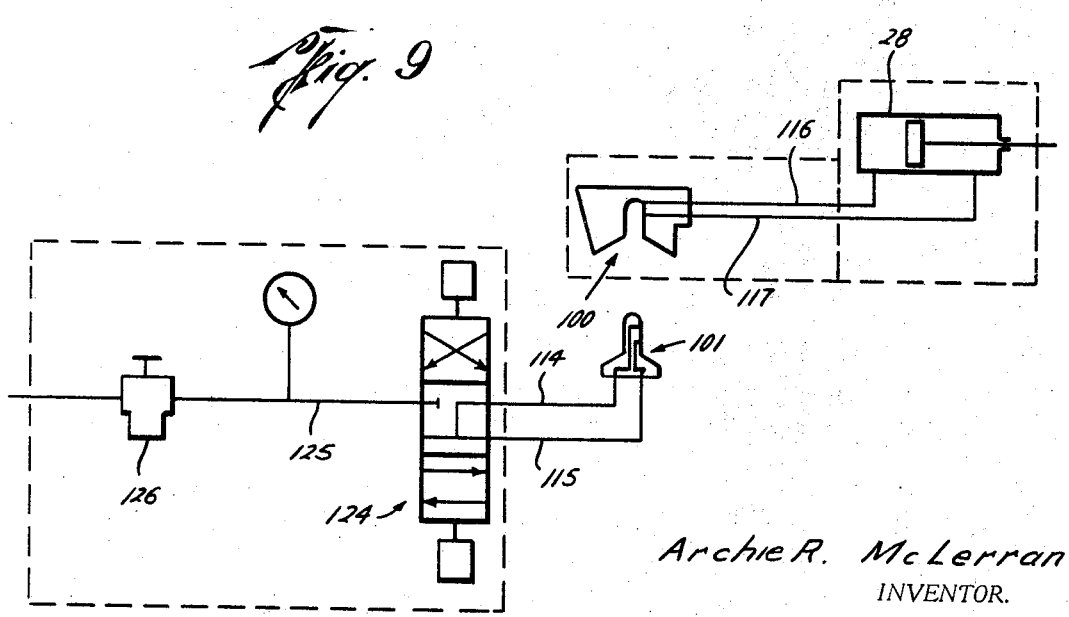
Archie R. McLerran
INVENTOR.
BY
ATTORNEYS

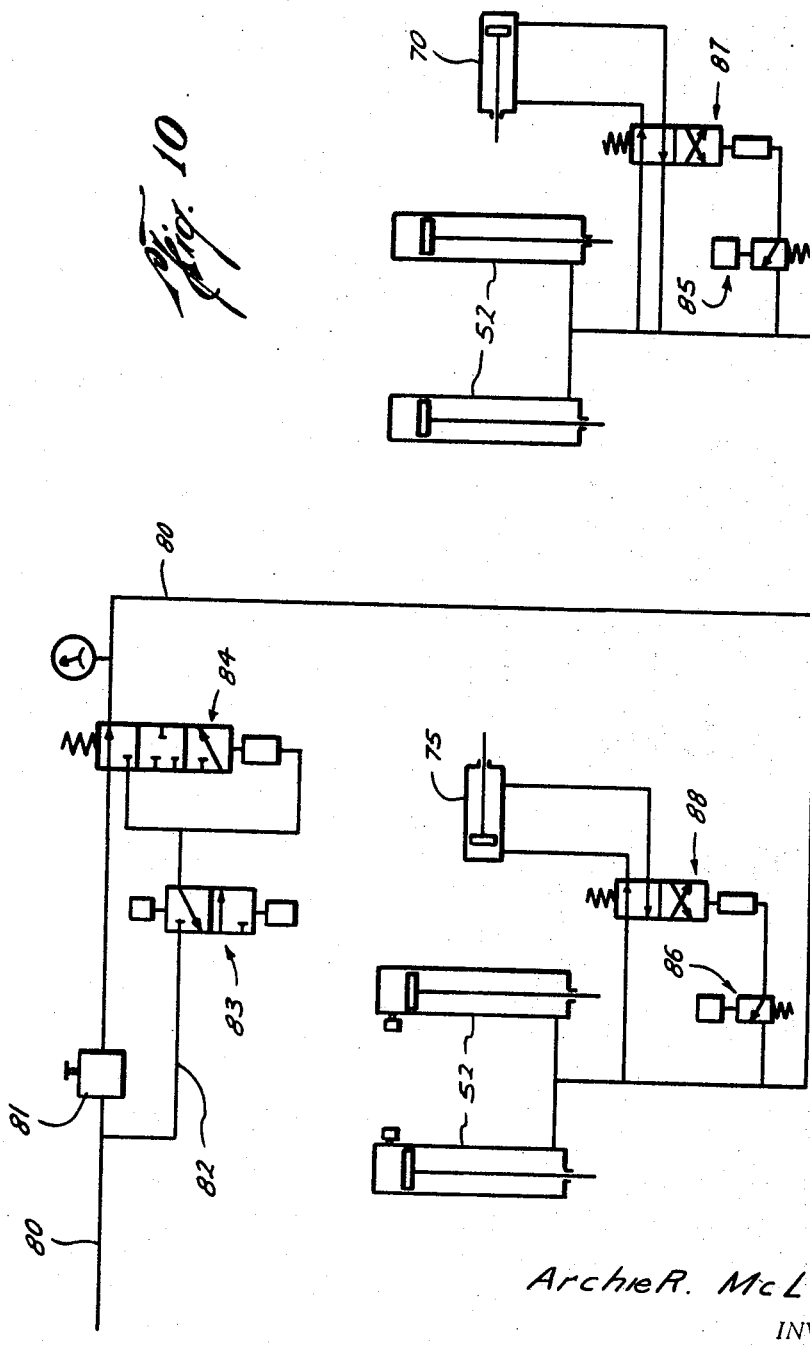

United States Patent Office 3,365,081
Patented Jan. 23, 1968

3,365,081
PIPE ELEVATOR AND POSITIONING
APPARATUS THEREFOR
Archie R. McLerran, Houston, Tex., assignor, by mesne assignments, to the United States of America, as represented by the National Science Foundation
Filed Dec. 13, 1965, Ser. No. 513,473
2 Claims. (Cl. 214—2.5)

ABSTRACT OF THE DISCLOSURE

The apparatus disclosed guides and positions a pipe elevator for receiving pipe from either a horizontal pipe rack or a well bore. Two posts are located on opposite sides of the well bore. A carriage is mounted on each post for vertical movement relative to the post and power cylinders arranged to move the carriages upwardly relative to the posts. The carriages are adapted to catch trunnions, which extend outwardly on opposite sides of the pipe elevator. The trunnions can rotate on the carriage and a separate power operated device is provided to rotate the elevators on the trunnions between a position with its pipe receiving opening parallel with the well bore and a position with the opening parallel with the axis of the pipe on the pipe rack. When moving pipe from the pipe rack into the well bore, the elevators are rotated on their trunnions to position the opening to receive a stand of pipe from the pipe rack. The elevators are then moved upwardly in the derrick to position the pipe stand for connection into the pipe string. The pipe stand is then lowered into the well bore by the elevators. The trunnions on the elevator engage the carriages on the posts as the pipe load is transferred from the elevators. The power cylinders then move the elevators up to the desired height, where they are rotated to receive another joint of pipe from the pipe rack. Conversely, when moving pipe from the well bore to the pipe rack, the carriages engage the trunnions on the elevator as the elevators lower the pipe stand onto the pipe rack and rotate the elevators back into a position to receive pipe from the well bore. The carriages move the elevators downwardly over the upward end of the pipe string, when the elevators have been so positioned. The elevators are power operated. They are connected to a source of power only when the elevators are in engagement with the carriages, since it is only during this time that the elevators are either opened or closed.

---

This invention relates generally to pipe handling equipment used on a drilling rig. In one of its aspects this invention relates to an improved pipe elevator. In another of its aspects it relates to apparatus for positioning a pipe elevator to receive and release pipe as the pipe is moved back and forth between a pipe rack and the well bore, where the pipe rack is of the type that the pipe is laid down in racking. In yet another aspect this invention relates to apparatus for releasably connecting a power operated pipe elevator to a source of power automatically when the elevator is in position to release or engage pipe.

Conventional practice on drilling rigs is to rack drill pipe in stands vertically in the derrick, when it is pulled from the hole to change the drilling bit, etc. When drilling offshore from a floating vessel, however, a long string of drill pipe racked vertically in the derrick raises the center of gravity of the vessel and decreases its stability. For this and other reasons, powered pipe racks have been designed upon which the pipe stands can be laid down when pulled from the hole. The pipe rack then delivers the stands back to the floor of the derrick one stand at a time to be run back into the hole. Since the pipe stands are supported in more or less a horizontal position, these racks are called "horizontal pipe racks," and will be so designated throughout the remainder of this specification. For an example of such a pipe rack, see World Oil, November 1964, pages 138 et seq.

It is an object of this invention to provide apparatus for positioning a pipe elevator to receive and release pipe when moving pipe between a well bore and a horizontal pipe rack.

When moving pipe between a horizontal pipe rack and a well bore, the longitudinal axis of the pipe and the opening through the elevator move through an angle of about 90°. To re-position the elevator to receive another stand, it must be rotated back through this angle. Therefore, it is another object of this invention to provide apparatus for positioning a pipe elevator for receiving and releasing pipe, when moving pipe stands between a horizontal pipe rack and a well bore, and to position the elevator in the proper attitude to receive the pipe stands, i.e., with the longitudinal axis of the opening through the elevator in alignment with the longitudinal axis of the next pipe stand to be received by the elevator.

It is another object of this invention to provide apparatus for positioning a pipe elevator for moving pipe between a well bore and a horizontal pipe rack that will rotate the elevator when empty to position the longitudinal axis of the opening therethrough to receive pipe from the pipe rack and which will hold the elevator in such position when releasing pipe to the pipe rack.

It is another object of this invention to provide apparatus for guiding a pipe elevator between a first position to receive from and discharge or release pipe to a horizontal pipe rack and a second position to receive or release pipe extending into the well bore and for rotating the elevator to position it with the proper attitude to receive pipe at either position.

There are various types of pipe elevators. The side door and center latch types are moved laterally into and out of engagement with the pipe below the tool joint or collar. Another type of elevator has an opening to receive the pipe and into and out of which the pipe is moved axially. Elevators of this type usually have an elevator body with a central opening, but no side opening. The opening then must be large enough to permit the passage of the tool joints or collars on the pipe. Thus, elevators of this type usually have pipe supporting members or rams that are movable laterally outward a sufficient distance to allow the passage of such tool joints, etc., and laterally inward a sufficient distance to engage the tool joint or collar and support the pipe. When in pipe supporting position, these members must be held against outward lateral movement. This is done usually by having the members wedge between the pipe and an inclined surface on the elevator body. Thus, the members must be moved upwardly as well as laterally to release the pipe from the elevator. Providing means for exerting a direct upward force on the members to lift them up and inclined surface complicates the operation and construction of this type of elevator.

Therefore, it is an object of this invention to provide an elevator of the type described above where the pipe supporting members or rams are moved up the inclined surface out of pipe supporting position by a lateral force only.

It is another object of this invention to provide an elevator of the type described that employs an inclined surface to hold the rams in pipe supporting position, in which the distance the rams can travel down the inclined surface is limited to prevent the rams from wedging between the surface and the pipe.

It is another object of this invention to provide an elevator having pipe supporting rams that are held against outward lateral movement, when supporting pipe, by an inclined surface that also serves to cam the rams upwardly out of engagement therewith when the rams are subjected to an outward lateral force.

Elevators of the movable ram type lend themselves readily to power operations. To avoid having to provide a self contained source of power on the equipment, it is supplied through flexible hoses or conductors. The elevator on a drilling rig, however, may oscillate some hundred feet or more while running and pulling a pipe string. It would be a nuisance to have to contend with flexible hoses or electrical conductors of this length, traveling up and down the derrick with the elevator, when the elevator needs power only at the end of its travel.

Therefore, it is another object of this invention to eliminate the need for power conduits to travel with a power operated elevator as it moves in the derrick handling pipe.

It is yet another object of this invention to provide a power operated elevator that does not require power to hold its pipe supporting rams in the closed position.

It is also an object of this invention to provide apparatus for releasably connecting a power operated elevator to a source of power only when the elevator is at or near the limit of its travel in the derrick.

These and other objects, advantages and features of this invention will be apparent to those skilled in the art from a consideration of this specification and appended claims.

The preferred embodiment of the invention is described in detail below in connection with the attached drawings in which:

FIGURES 1, 2, and 3 are isometric views of the elevator positioning apparatus with the pipe elevator in three different positions;

FIGURE 4 is a vertical sectional view of the pipe elevator shown in FIGURES 1, 2, and 3;

FIGURES 5A and 5B are sectional views taken along lines 5A—5A and 5B—5B respectively of FIGURE 3;

FIGURE 6 is a top view of the pipe elevator and one side of the elevator positioning apparatus with the top portion of the elevator housing broken away to show the relative position of the parts of the elevator when the elevator is closed;

FIGURE 7 is a top view of the elevator similar to FIGURE 6 showing the elevator open ready to receive or release pipe;

FIGURE 8 is a view on an enlarged scale, partially in section and partially in elevation, of the apparatus for releasably connecting the elevator to a source of power when the elevator is at or near a position to release or receive pipe;

FIGURE 9 is a schematic diagram of the pneumatic system associated with the apparatus of FIGURE 8; and FIGURE 10 is a schematic view of the pneumatic system employed to operate the elevator positioning apparatus of this invention.

Figure 1:
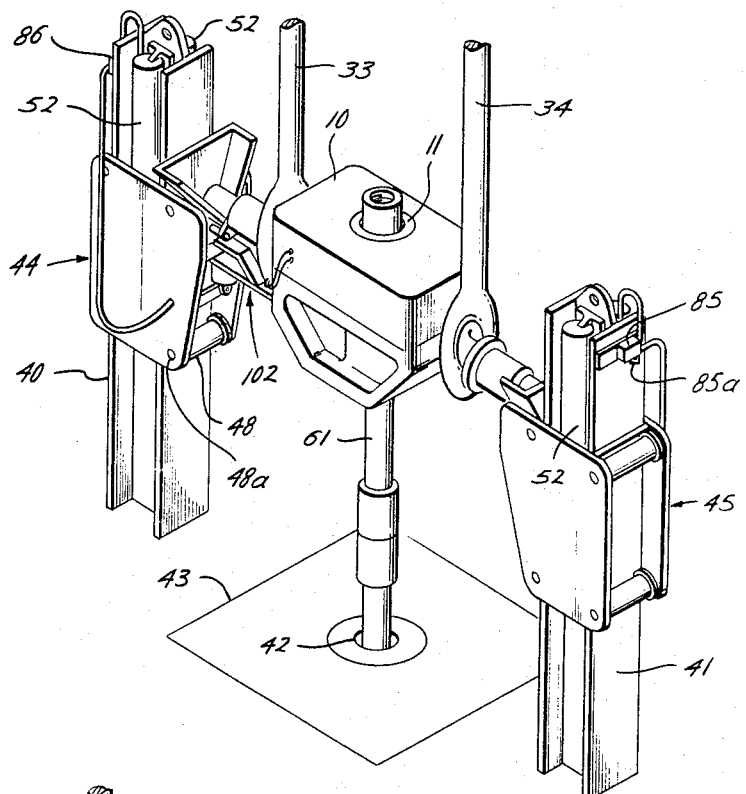
Figure 2:
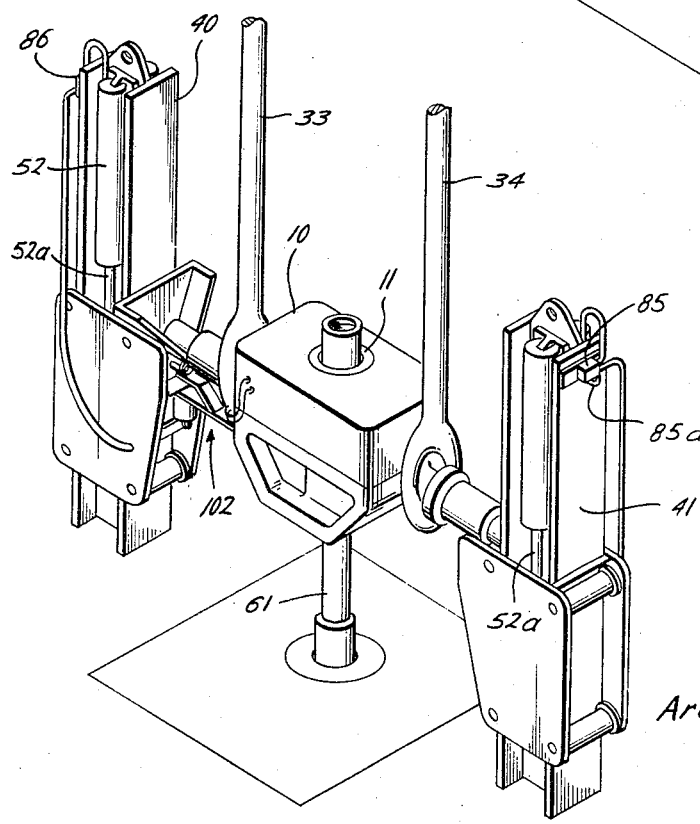

Referring first to FIGURES 1–3, means are provided to guide the pipe elevator between a first pipe receiving and discharging position shown in FIGURE 3 to a second pipe receiving or releasing position shown in FIGURE 2. In FIGURE 3, the elevator is rotated to the position to receive or discharge pipe to and from a horizontal pipe rack (not shown). In the FIGURES 1 and 2 the elevator is rotated to receive or release pipe residing in the well bore.

Elevator 10 has a central opening 11 through which the pipe moves axially into and out of position to be engaged by the elevator. As shown in FIGURES 4, 6, and 7, the elevator includes a body 12 in which opening 11 is located.

Upwardly facing surface 13 of the body is stepped upwardly and outwardly from opening 11, as shown, to provide three axially spaced, substantially horizontal, flat, annular areas with two upwardly and outwardly inclined annular areas connecting the horizontal areas. Thus, upper surface 13 has a first substantially horizontal, flat, annular area 13a adjacent opening 11, an upwardly and outwardly inclined second area 13b adjacent the first area and third substantially horizontal, flat, annular area 13c outward from and adjacent the second area. A fourth area 13d is adjacent the third area. This area is upwardly and outwardly inclined like second area 13b and is adjacent to a fifth flat annular area 13e that is substantially horizontal like the first and third areas.

Moveable pipe supporting members or rams 14 and 15 are supported by upper surface 13 of the elevator body. Each ram has its lower surface stepped to provide annular areas 14a–14d and 15a–15d to engage or be contiguous to areas 13a–13d on the body, respectively, when the rams are in position to support a pipe stand, as shown in FIGURE 4. Preferably, most, if not all, of the pipe weight is transferred from the rams to areas 13a and 13b on the body. This is preferred because these areas are closest to the pipe, which keeps the bending stress in the rams to a minimum for a given load. The rams may engage areas 13c and 13d, also, but this should occur, if at all, only after a substantial portion of the pipe weight is being supported by the two areas adjacent the opening through the elevator.

When supporting "bottleneck" pipe, such as the type shown, which has a tool joint box 18 that tapers downwardly and inwardly at its lower end from its maximum outside diameter to that of the pipe, the pipe rams are provided with similarly inclined surfaces 16a and 16b to engage the tapered surface of the tool joint. Since the lines of force between the tool joint and the rams are normal to surfaces 16a and 16b, there will be a horizontal component of this force tending to move the rams laterally. This force is resisted by the inclined area 13b on the body. To effectively resist this horizontal component, the angle that area 13b is inclined from the vertical must be equal to or less than the angle that inclined surfaces 16a and 16b are inclined from the vertical.

In accordance with this invention, however, to release the pipe, rams 14 and 15 are moved laterally up inclined area 13b by a lateral force only. This force will not provide a lifting force directly to the rams, but inclined area 13b will cam the rams upwardly, if the force urging the rams laterally is sufficient. The flatter this area, i.e., the greater the area is inclined from the vertical, the smaller the lateral force required.

For example, the horizontal lateral force, $F_H$, required to move one ram up inclined surface 13b can be calculated as follows:

$$F_H = W(\tan \theta + \alpha)$$

where $W$ = weight of the ram, lbs.
$\theta$ = angle area 13b is inclined upwardly from the horizontal, and
$\alpha$ = arc tan of the coefficient of friction between the ram and the body.

If the ram and elevator body are made of steel, as they usually will be, the coefficient of friction if they are not lubricated is .14, if lubricated .10. The arc tan of these coefficients are 8° and 6°, respectively. Theoretically, then, the maximum that $\theta$ can be is 82° or 84° depending on whether the parts are lubricated or not. As a practical matter, however, $\theta$ must be considerably less than these limits. On the other hand, $\theta$ cannot be greater than the compliment of the angle of inclination from the vertical of pipe engaging surfaces 16a and 16b on the rams. Therefore, two factors must be weighed when determining the inclination of surface 13b. First, it must be inclined from the vertical at an angle that is equal to or less than the angle of inclination from the vertical of pipe engaging surfaces 16a and 16b to keep the rams from moving laterally when supporting a pipe string. Secondly, it must be inclined from the vertical at such an angle that a reasonable lateral force can move the rams up the inclined area and out of pipe engaging position.

An angle of inclination from the vertical for both the inclined area 13b and pipe engaging surfaces 16a and 16b of about 35°, appears to be the best compromise between the two considerations. For dry steel on steel, the lateral force required to move a ram up the inclined cam surface, area 13b, at this angle, is 1.963 times the weight of the ram. If the surfaces are lubricated, the force is 1.8 times the weight of the ram. Most bottleneck drill pipe, however, has an 18° taper. Thus, for this pipe the lateral force required to move a ram up an 18° lubricated slope is 4.011 times the weight of the ram. For non-lubricated surfaces, it is 4.7 times the ram weight. As the angle of taper from the vertical is further decreased, the lateral force required to move the rams up inclined surface 13b increases rapidly.

Means are provided to exert a lateral force on the rams and move them laterally out of pipe engaging position. In the embodiment shown, the rams and upper surface of the body are enclosed by housing 19, which is attached to the body. Each ram is pivotally connected to housing 19, by means of arms 20 and 21. Cam pins 22 and 23 engage holes in the rams and also contoured slots 24 and 25 in cam plate 26. The cam plate is rotatably mounted around opening 27 in housing 19, and cam slots 24 and 25 therein are designed to exert a lateral force on the cam pins and move the rams laterally into and out of position to support the pipe, as the cam plate is rotated back and forth.

The cam plate can be rotated manually by providing it with a laterally extending handle (not shown) or by power means. In the embodiment shown fluid cylinder 28 is positioned to provide the power to rotate the cam plate to open and close the elevator. Fluid under pressure is provided to the fluid cylinder in a manner to be described below. In the embodiment shown, the outer end of the rams are tapered at the same angle as tapered surface 13d and tapered surface 13d has the same radial length and taper as surface 13b. This adds stability to the rams as they are being moved laterally by providing support for them at two spaced points. Also, with this arrangement when the rams are clear of inclined surfaces they will be supported by two spaced areas, areas 13c and 13e, as they are moved further laterally out of pipe supporting position. With the rams so supported, they do not need to be held in either position. Therefore, power need not be supplied to cylinder 28 except when the rams need to be moved.

Extending laterally on opposite sides and integrally connected to body 12 are trunnions 29 and 30. The trunnions are provided with bearing surfaces 31 and 32, respectively, to extend through the eyes of elevator links 33 and 34 to support the elevator in the conventional manner from the hook and traveling block of the drilling rig. To hold the links in place on the trunnions, sleeves 35 and 36 are attached to the trunnions and provided with outwardly extending flanges 36 and 37. Outboard of sleeves 35 and 36, the trunnions are of reduced diameter to provide additional bearing surfaces 38 and 39. These latter two portions of the trunnion are provided to engage the elevator positioning apparatus of this invention to allow said apparatus to guide the elevator between the pipe receiving and discharging positions shown in FIGURE 2 and FIGURE 3.

In the embodiment shown, the guide means comprise guide posts 40 and 41 and carriages 44 and 45, which are slidably mounted on posts 40 and 41, respectively. The posts are located on two opposite sides of and are parallel to an extension of the longitudinal axis of the well bore. The well bore is not shown in the drawings, however, it is in axial alignment with opening 42 in spider 43. The spider is located on the derrick floor to support the pipe in the well bore, when it is not being supported by the elevator. The carriages are mounted on posts 40 and 41 for movement parallel to an extension of the longitudinal axis of the well bore. Both carriages are identical so only carriage 44, the one shown in FIGURE 6, will be described in detail.

It includes two side plates 46 and 47 between which are located four support rollers 48. The rollers are rotatably supported on shafts 48a that extend through the rollers and both side plates. Two rollers are located on each side of post 41, which in the embodiment shown, is an H-beam located so that the rollers can roll along the outer surfaces of the flanges of the beam. Each roller has outwardly extending flanges 49 at each end located on opposite sides of the beam's flanges to guide the carriage as it moves along the post.

Carriages 44 and 45 are equipped with saddles 50 and 51, respectively. As seen in FIGURES 5A and 5B, these saddles have two opposite sides that diverge upwardly to form V-shaped pockets to receive portions 38 and 39 of the trunnions. Posts 40 and 41 are spaced apart such that the outer ends of the trunnions will engage saddles 50 and 51 on the carriages and the elevator will be guided thereby, as they move between the posts. Located on opposite sides of each post are fluid cylinders 52. Piston rods 52a of the cylinders are connected to the carriages so the cylinders can exert an upward force on the carriages urging them toward the upper end of the posts. Means are located at the top of each post to stop the upward movement of the carriages to position the elevator in the proper position to receive pipe from the pipe rack. In the embodiment shown, valves 85 and 86 are mounted adjacent the top of the posts to engage the upper outside roller of each carriage and stop its upward movement. The valves are mounted so they can be moved to adjust the upper position of the carriages to locate the elevator to receive pipe of different sizes (adjustable mounting not shown in the drawings). Valves 85 and 86 are of the normally closed type, which are opened when valve stems 85a and 86a (the latter is shown only in FIGURE 10) are engaged by the carriage for purposes that will be explained below.

When running pipe into the hole from a horizontal pipe rack, a pipe stand, such as stand 61 in FIG. 3, is picked up by the elevator and raised upwardly in the derrick until it is in axial alignment with stand 60 resting on spider 43. The threaded connection between the two is made up, the whole string of pipe is picked up, the spider is released, and the string is lowered into the hole until the upper end of stand 61 is in position to be supported by the spider, as shown in FIGURE 2. The weight of the string is transferred to the spider, the elevator is released from pipe stand 61, and moved upwardly into position to receive another stand of pipe from the pipe rack. Thus, the elevator moves between a first position (FIGURE 3), where it receives pipe from the pipe rack and a second position (FIGURE 2) where it releases the pipe after it has been run into the hole.

Means are provided to rotate the elevator, when empty, to move the pipe receiving opening from a vertical to the horizontal position, shown in FIGURE 3. This aligns the longitudinal axis of opening 11 with the longitudinal axis of the pipe stand to be picked up. In the embodiment shown, sleeve 35 has crank arm 35a integrally attached thereto. This crank arm is positioned so that when it is located in the position shown in FIGURE 5A, longitudinal axis 11a of opening 11 in the elevator will be horizontal, whereas when the crank arm is in the position shown by the dotted lines, the longitudinal axis of the elevator will be in alignment with the longitudinal axis of the well bore. To move the crank arm and position the elevator with the proper attitude to receive pipe from the pipe rack, fluid cylinder 70 is mounted on carriage 45 with its piston rod 41 connected to one end of L-shaped member 72. The L-shaped member is pivotally connected to carriage 45 by pin 73 located at the intersection of the two arms of the member. Thus, as piston rod 71 is reciprocated by cylinder 70, roller 74 on the outer end of L-shaped member 72 will engage crank arm 35a and rotate the elevator to the proper attitude to receive pipe from the pipe rack.

When pulling the pipe from the hole and returning it in stands to the horizontal pipe rack, the elevator is lowered over the top end of the pipe string, such as pipe stand 61 in FIGURE 2. The stand is pulled out of the hole until the spider can engage the upper end of stand 60, the next stand below. Pipe stand 61 is broken out and laid down horizontally on the pipe rack with its lower end going outwardly first as the elevator is lowered back toward the derrick floor.

As the pipe is laid down, the elevator will rotate with the pipe through an angle of about 90° and return to the first pipe receiving and releasing position of FIGURE 3 in the attitude shown. The elevator is then released from the pipe and the pipe stand moved axially through the opening in the elevator onto the pipe rack. The pipe stand will hold the elevator rotated in the position shown until the stand is clear thereof. Afterward, gravity will rotate the elevator to the proper attitude to receive pipe at the second pipe receiving position, if the center of gravity of the elevtaor is properly located.

Preferably, however, means are provided to hold the elevator in alignment with the pipe stand being returned to the pipe rack to allow the stand to be completely removed before the elevator is allowed to rotate back into position to receive another stand of pipe from the hole. Also, preferably, means are provided to rotate the elevator back to this position. Therefore, sleeve 36, as shown in FIGURE 5B, is provided with crank arm 36a and post 40 has hydraulic cylinder 75 and L-shaped member 76 mounted thereon to rotate the elevator on its trunnions in the same manner as cylinder 70 mounted on post 41 rotates the elevator through crank arm 35a. With this arrangement, when pipe is being pulled out of the hole, cylinders 70 and 75 are actuated as the stand is being pulled upwardly and the elevator is clear of the carriages. This moves L-shaped members 72 and 76 to the positions shown by the solid lines in FIGURES 5A and 5B. Then, as the elevator is lowered into engagement with the saddles on the carriages, L-shaped arm 72 will be in position to engage crank arm 35a and hold the elevator against rotation until the pipe has cleared opening 11. Then the pressure can be reversed in double acting cylinders 70 and 75 and L-shaped arm 72 will be pivoted out of the way to the position shown by the dotted line in FIGURE 5A, while arm 76 is pivoting the elevator back to the vertical position, as shown in the dotted lines in FIGURE 5B.

In the embodiment shown, the elevator is power operated by fluid pressure. To avoid the necessity of connecting fluid pressure lines permanently to the elevator, which would require that these lines travel up through the derrick therewith, means are provided to connect the fluid cylinder of the elevator to a source of power (which may be electrical power) only when the elevator is in or near a position where it is to accept or release pipe. In the embodiment shown, the elevator requires power only when it is in engagement with the elevator positioning apparatus. As shown in FIGURES 8 and 9, female socket 100 of a plug-in type pressure connection is attached on th bottom of link 33. It is positioned to engage male portion 101 of the connection, which is mounted on carriage 44 by bracket 102.

Female socket 100 comprises a cylindrical body 103 having a central opening 104. The body is attached to link 33 through link adapter 105. Attached to the end opposite the link is guide plate 106, which has a conically shaped surface 107 for guiding end 108 of the male member into the opening in the socket.

The male member is connected to support arm 109 of the bracket by rod 110 and retainer plate 111. The support arm has an opening into which the plate partially extends. Rod 110 extends through the opening in the arm and through an opening in the plate. Nut 112 limits the travel of the rod and the male member upwardly from the arm. Urging the rod and male member upwardly is coil spring 113. Preferably, bracket 102 is mounted on carriage 44 so spring 113 will be compressed to some extent before the trunnions or the elevators engage the saddles on the carriages.

Since power cylinder 28 that operates the elevator is double acting for moving the rams laterally in two directions, two fluid pressure lines 114 and 115 are provided. These are in turn connected to pressure lines 116 and 117 through the male and female members to allow pressure to be supplied selectively to either end of cylinder 28. Thus, lines 116 and 117 are connected to opening 104 in the socket by spaced holes 118 and 119, respectively. The male member has openings 120 and 121 with their upper ends positioned to be opposite openings 118 and 119, respectively, when the male member is extending into opening 104. Openings 120 and 121 are connected to pressure lines 114 and 115, respectively. Packing 122 is positioned in opening 104 to sealingly engage the male member and insure that the pressure fluid from lines 114 and 115 are properly isolated. Spacer 123 is located in opening 104 to help support the packing.

FIGURE 9 shows schematically the pneumatic system for supply power to the elevators through the releasable connection just described. Air pressure is supplied to manually operated valve 124, through supply line 125 and pressure regulation 126. As shown valve 124 can be positioned to stop the flow of air to lines 114 and 115, or connect either line to pressure line 125 while exhausting pressure from the other.

When the connection is broken by raising the elevator upward away from the carriages, no power fluid can be supplied to power cylinder 28. Therefore, this connection can be used with elevators of the type shown that do not require a continuing force from the closing mechanism to keep them closed around the pipe or in the open position as the case may be.

FIGURE 10 shows schematically the fluid pressure system employed to operate the elevator positioning apparatus above described. Preferably, the power medium is compressed air, since it is more shock absorbing than liquid. As shown in the diagram, air supply line 80 is connected to lifting cylinders 52 through regulator 81 and valve 84. These are the cylinders that urge the carriages upwardly toward the top of the posts on which they are mounted. Air is supplied to these cylinders at all times. It is regulated to a predetermined maximum pressure by regulator 81. Preferably, the regulator is adjusted so that the pressure in cylinders 52 will be sufficient to lift the carriage when empty but not when the elevators are in the saddles.

A regulator bypass line 82 is connected to supply line 80 through manually operated valve 83 and pressure operated motor valve 84. Fluid cylinders 70 and 75, which operate the mechanism for rotating the elevators to the proper pipe receiving position are also connected to supply line 80 through spring loaded push-down-to-open valves 85 and 86, respectively, and motor valves 87 and 88. These latter two valves are spring biased sufficiently to keep them from changing positions until full line pressure is applied thereto.

In operation, when going in the hole, the apparatus works as follows: Assume that stand 60, as shown in FIGURE 3, has been connected into the pipe string and lowered into position to be supported by spider 43. The trunnions engaged the saddles on the carriages and moved the carriages downwardly on the guide posts with the elevators and the pipe. In the drawings, the pipe is shown as having an upset adjacent its upper end. This is done so that the pipe can be supported on a shoulder by both the spider and the elevator. Conventional slips would be used, of course, and the upset would not be required.

Stand 60 then was lowered into position to be supported by spider 43, as shown in FIGURE 3. The elevator is released and valve 83 is manually shifted to supply full line pressure to motor valve 84. This shifts the valve and supplies full line pressure to line 80. This provides sufficient power for the carriage lifting cylinders 52 to lift the carriages and also the elevator, as allowed by the clearance in the eyes of the elevator links. The traveling block hook assembly is then lifted by the draw works of the rig (not shown) and the cylinders concomitantly move the elevator upwardly to the position shown in FIGURE 3, which is the first pipe receiving position. As the carriages reach this position, they engage operating levers 85a and 86a of valves 85 and 86, respectively. This actuates motor valves 87 and 88 and reverses the supply of air to double acting cylinders 70 and 75. This causes these cylinders to move to the position shown in dotted lines in FIGURES 5A and 5B and rotate elevator 10 to the position shown in FIGURE 3. The longitudinal axis of the elevator is now in axial alignment with stand 61, the next stand of pipe to be picked up. The pipe rack then feeds the stand axially through the opening in the elevator. The elevator is closed and hoisted to raise the pipe stand into position to be connected into the string. After the elevator has been picked up out of the saddles on the carriage, manual valve 83 is returned to the position shown in FIGURE 10, releasing full line pressure from supply line 80. With the reduction in pressure, the springs of motor valves 84, 87 and 88 return these valves to their original position. This causes fluid cylinders 70 and 75 to return their L-shaped lever arms to the position shown in dotted lines in FIGURES 5A and 5B. This places the carriages in position to receive the elevator as it lowers stand 61 into the hole. This procedure is repeated for each stand of pipe.

When coming out of the hole, the elevator is lowered over the top stand in the pipe string, for example, stand 61 as shown in FIGURE 2. The elevator is actuated to engage the stand and then moved upward to pull the stand out of the hole. As the elevator is raised, carriages 44 and 45 move upwardly on the posts, since cylinders 52 are continuously supplied with sufficient air pressure to lift the carriages. When the carriages reach the top after being relieved of the weight of the elevator, manual valve 83 is shifted to actuate pressure cylinders 70 and 75. This moves the elevator rotating mechanism to the position shown in solid lines of FIGURES 5A and 5B. After the pipe has been broken out, it is lowered onto the pipe rack and the elevator again engages the saddles, with the elevator rotated as shown in FIGURE 3. The elevator positioning apparatus, however, is prepared to engage the lever arms 35a and 36a and hold the elevator in this attitude, while pipe stand 61 is moved out of the opening in the elevator onto the pipe rack. As soon as the stand has cleared the elevator, manual control 83 is returned to the position shown in FIGURE 3, returning the pressure in the supply line back to that controlled by the regulator. This causes spring loaded motor valves 87 and 88 to return to their spring biased position; this, in turn, will cause cylinders 70 and 75 to rotate the elevator 90° until it is in axial alignment with the well bore once again. With the reduced pressure the weight of the elevator will be sufficient to lower the carriages downwardly as the elevator is lowered over the end of stand 60, the next stand to be pulled from the hole.

With this arrangement, less pressure is available to rotate the elevator back to a vertical position than there was to rotate it to receive pipe from the pipe rack. Usually, however, the center of gravity of the elevator will be such that gravity will be helping to return the elevator to the vertical position. Therefore, less pressure is required for this job.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed:

1. Apparatus for positioning a pipe elevator to receive and release pipe when moving pipe between a horizontal pipe rack and a well bore, said apparatus comprising, a power operated pipe elevator having support members extending from opposite sides thereof and laterally of the direction of travel of the elevator, means engaging the support members for moving the elevator along an extension of the longitudinal axis of the well bore, means for guiding the elevator as it moves along said extension of the longitudinal axis of the well bore between a first position to release pipe for return to the pipe rack and to receive pipe from the pipe rack and a second position to engage pipe to be removed from the well bore and to release pipe run into the well bore, said guide means being selectively operable, so that at times it is out of engagement with the elevator, means for rotating the elevator into an attitude to receive pipe from the pipe rack when the elevator is empty, and means for releasably connecting the elevator to a source of power only when the support members are in engagement with the guide means.

2. The apparatus of claim 1 in which said connecting means comprises a connector having a female section and a male setion, means for mounting one of said sections for movement with the elevators, and means mounting the other section to connect with the section movable with the elevators when the support members are in engagement with the guide means.

References Cited

UNITED STATES PATENTS

| | | | |
|---|---|---|---|
| 2,743,823 | 5/1956 | Breedlove | 214—2.5 |
| 3,123,231 | 3/1964 | Jenkins et al. | 214—2.5 |
| 3,126,107 | 3/1964 | Waddy | 214—700 X |
| 3,177,944 | 4/1965 | Knights | 214—2.5 X |

GERALD M. FORLENZA, *Primary Examiner.*

F. E. WERNER, *Assistant Examiner.*